(12) United States Patent
Clement et al.

(10) Patent No.: US 6,333,288 B1
(45) Date of Patent: Dec. 25, 2001

(54) LEAD-FREE OPTICAL GLASSES

(75) Inventors: Marc Clement, Mainz; Silke Wolff, Hückeswagen; Magdalena Winkler-Trudewig, Mainz, all of (DE)

(73) Assignee: Schott Glas (DE)

( * ) Notice: Subject to any disclaimer, the term of this patent is extended or adjusted under 35 U.S.C. 154(b) by 0 days.

(21) Appl. No.: 09/567,088

(22) Filed: May 8, 2000

(30) Foreign Application Priority Data

May 6, 1999 (DE) .............................. 199 20 865

(51) Int. Cl.⁷ .......................... C03C 3/066; C03C 3/068
(52) U.S. Cl. .................... 501/78; 501/79; 501/901; 501/903
(58) Field of Search ................ 501/76, 78, 79, 501/901, 903

(56) References Cited

U.S. PATENT DOCUMENTS

| | | | |
|---|---|---|---|
| 4,390,638 | * 6/1983 | Mennemann et al. | 501/77 |
| 4,400,473 | * 8/1983 | Mennemann et al. | 501/77 |
| 4,481,299 | * 11/1984 | Tajima | 501/73 |

FOREIGN PATENT DOCUMENTS

| | | |
|---|---|---|
| 32 01 344 | 7/1983 | (DE) . |
| 35 34 575 | 4/1986 | (DE) . |
| 52-25812 | 2/1977 | (JP) . |
| 53-90312 | 8/1978 | (JP) . |
| 58-46459 | 10/1983 | (JP) . |
| 60-221338 | 6/1985 | (JP) . |
| 62-12633 | 1/1987 | (JP) . |
| 62-100449 | 9/1987 | (JP) . |
| 63-170247 | 7/1988 | (JP) . |
| 1-133956 | 5/1989 | (JP) . |

OTHER PUBLICATIONS

Hans Bach et al., "Property of Optical Glass", Schott Series on Glass and Glass Ceramics, Chapter 214 +215 pp. 27–33 (No Date Available).
English Abstract of JP 62–100449, Sep. 05, 1987.
English Abstract of JP 60–221338, Jun. 11, 1985.
English Abstract of JP 63–170247, Jul. 14, 1988.
English Abstract of DE 35 34 575, Apr. 03, 1986.
English Abstract of JP 62–12633, Jan. 02, 1907.
English Abstract of DE 32 01 344, Jul. 28, 1983.
Hans Bach et al., "The Properties of Optical Glass", Schott Series on Glass and Glass Ceremics, *Science Technology, and Applications*, 1995, pp. 26–39 (No Month).

* cited by examiner

Primary Examiner—David R. Sample
(74) Attorney, Agent, or Firm—Millen, White, Zelano & Branigan, P.C.

(57) ABSTRACT

The invention can relate to essentially lead-free optical glasses having a refractive index $n_d$ of from about 1.65 to about 1.87 and an Abbe number $v_d$ of from about 27 to about 43 and a composition (in % by weight, based on oxide) of $SiO_2$ about 10–about 25, $B_2O_3$>about 10–about 25, $Na_2O$ about 2.5–about 10, $K_2O$ 0–about 3, CaO about 0.5–about 5, BaO about 15–about 30, ZnO about 5–about 15, $TiO_2$ about 6–about 15, $ZrO_2$ about 0.5–about 8, $Y_2O_3$ about 0.1–about 2, $La_2O_3$ about 0.5–about 8, $Nb_2O_5$ about 6–about 12, with $La_2O_3+Nb_2O_5 \leqq$ about 17, $Ta_2O_5$ 0–about 1, and $Gd_2O_3$ 0–about 1.

10 Claims, No Drawings

LEAD-FREE OPTICAL GLASSES

FIELD OF THE INVENTION

The present invention relates to essentially lead-free optical glasses, and more particularly to essentially lead-free optical glasses having refractive indexes $n_d$ of from about 1.65 to about 1.87 and Abbe numbers $v_d$ of from about 27 to about 43.

BACKGROUND OF THE INVENTION

Because the glass components PbO and $As_2O_3$ have entered public debate as environmental pollutants, there is a demand by the manufacturers of optical equipment for 10 PbO-free and preferably also $As_2O_3$-free glasses having the optical properties substantially the same as glasses having these oxides.

Simple replacement of lead oxide by one or more constituents generally does not succeed in reproducing the desired optical and glass-engineering properties affected by PbO. Instead, new developments or extensive changes in the glass composition are necessary.

The patent literature reveals some specifications which have already described lead-free glasses having optical values from the stated range and having similar compositions. However, the glasses have a wide variety of disadvantages.

Both the glasses of the unexamined Japanese publication JP 62-100 449 A, having refractive indexes $n_d$ of from 1.64 to 1.88, and those of JP 60-22 133 8 A, having refractive indexes $n_d$ of from 1.62 to 1.85, contain $Li_2O$ as a required constituent, contents of up to 15 and 12% by weight respectively being possible. $Li_2O$-containing glasses of this type are very susceptible to crystallization. The same also applies to the glasses of JP 63-170 247 A, which contain at least 5 mol-% of $Li_2O$.

The glasses of the first-mentioned specification also contain from 2 to 20% by weight of $Sb_2O_3$. Use of this component in such amounts makes increased safety precautions necessary during production.

DE-A 35 34 575 Al relates to glasses having refractive indexes $n_d \leq 1.59$ for eyeglass lenses having color contrast amplification. The glasses, which vary greatly in their composition, contain various coloring components in a base glass containing up to 33% by weight of $Nd_2O_3$.

The glasses of JP 53-90 312 A have relatively low refractive indexes of $n_d \leq 1.67$. They contain at least 3% by weight of the glass former $Al_2O_3$ in order to counter the tendency toward crystallization caused by the relatively high content of alkaline earth metal oxides, but this has a disadvantageous effect on the melting properties and the "length" of the glass. The latter also applies to the $Al_2O_3$- and F-containing glasses of JP 1-133956 A having low refractive indexes. The glasses of JP 62-126 33 A, which likewise have low refractive indexes, contain expensive $Cs_2O$ as a required component and have high proportions of $SiO_2$ of from 30 to 75 mol-%.

German Patent Specification DE 32 01 344 C2 describes high-refractive index glasses having a refractive index $n_d \leq 1.79$ in which BaO is only an optional component and which contain high proportions of at least 13% by weight of the expensive component $La_2O_3$, which promotes crystallization at these rather high contents.

JP 52-25812 A and JP 58-46459 B2 describe flint glasses from the $SiO_2$—$Nb_2O_5$—$TiO_2$—$R_2O$(—RO) system, where some of the $Nb_2O_5$ can be replaced by $Ta_2O_5$ and some of the $SiO_2$ can be replaced by $B_2O_3$. The $B_2O_3$ content should not exceed 10% by weight and 5% by weight respectively (based on all the glass) owing to crystallization phenomena.

SUMMARY OF THE INVENTION

As used herein, the term "essentially component-free" means a material having an extremely low level of the referenced component, such as, for example, an unavoidable impurity.

A feature of the invention is to provide lead-free, an essentially desirably lead-free, optical glass having a refractive index $n_d$ of from about 1.65 to about 1.87 and an Abbe number $v_d$ of from about 27 to about 43 which have good melting and processing properties and are inexpensive to produce.

This feature can be achieved by the glasses described as lead-free optical glasses having a refractive index $n_d$ of from 1.65 to 1.87 and an Abbe number $v_d$ of from 27 to 43, and including the following composition (in % by weight, based on oxide): $SiO_2$ 10–25, $B_2O_3$>10–25, $Na_2O$ 2.5–10, $K_2O$ 0–3, CaO 0.5–5, BaO 15–30, ZnO 5–15, $TiO_2$ 6–15, $ZrO_2$ 0.5–8, $Y_2O_3$ 0.1–2, $La_2O_3$ 0.5–8, $Nb_2O_5$ 6–12, with $La_2O_3$+$Nb_2O_5 \leq 17$, $Ta_2O_5$ 0–1, $Gd_2O_3$ 0–1 and optionally a fining agent.

The glasses can include the glass formers $SiO_2$ (about 10–about 25% by weight) and $B_2O_3$ (>about 10–about 25% by weight) in balanced proportions. This produces both good melting properties of the glasses, which generally improve with increasing $B_2O_3$ content and generally worsen with increasing $SiO_2$ content, and good chemical resistance, which would generally worsen at an excessive $B_2O_3$ content. The $B_2O_3$ content also can contribute to the good devitrification stability. It has been found that the devitrification tendency would generally increase excessively if said minimum $B_2O_3$ content were reduced. The $B_2O_3$ content is preferably at most about 20% by weight. Particular preference is given to a $B_2O_3$ content of from about 14 to about 19% by weight. The $SiO_2$ content is preferably at least about 15% by weight and particularly preferably at most about 20% by weight.

Desirably, the glasses include about 15–about 30% by weight of BaO. This proportion of BaO is required in order to achieve the desired Abbe number region. The BaO content is preferably at least about 18% by weight. Particular preference is given to a content of at least about 25% by weight. Especially due to the balanced proportions of $B_2O_3$ and $SiO_2$ in relation to the BaO content, the melting properties of the glasses can be particularly good. In addition to BaO, the glasses can include about 0.5–about 5% by weight, preferably about 0.5–about 3% by weight, particularly preferably about 0.5–about 2.5% by weight, of CaO. The presence of CaO in addition to BaO can improve the crystallization stability of the glasses, as does the presence of ZnO, of which the glass can include about 5–about 15% by weight, preferably about 5–about 12% by weight, for stabilization and in order to set the high refractive index. Particular preference is given to a ZnO content of from about 7 to about 11% by weight.

The glasses can include both $TiO_2$ (about 6–about 15% by weight, particularly preferably about 7–about 12% by weight) and $ZrO_2$ (about 0.5–about 8% by weight, preferably about 1–about 5% by weight, particularly preferably at least about 2.5% by weight). These two components can improve the chemical resistance, in particular the alkali resistance. At higher contents, the crystallization stability could be greatly reduced.

It is particularly preferred for the glasses to include $ZrO_2$ and $TiO_2$ in a certain ratio, more precisely in a $ZrO_2/TiO_2$ weight ratio of from about 0.06 to about 0.85. This ratio can make it easier to achieve a high refractive index at the same time as a low Abbe number. Desirably, it is satisfied with $ZrO_2$ in an amount of from about 1 to about 5% by weight.

Desirably, the glasses include about 0.5–about 8% by weight, particularly preferably about 0.5–about 2% by weight, of $La_2O_3$ and about 6–about 12% by weight, preferably about 6–about 10% by weight, particularly preferably about 7–about 9.5% by weight, of $Nb_2O_5$. These ranges facilitate the desired optical position, in particular low Abbe numbers at the same time as high refractive indexes. In addition, both components can increase the transmission of the glasses. A further increase in the content could result in deviating $n_d$ and $v_d$ values and an unnecessary increase in the cost of the batch. A sum $(La_2O_3+Nb_2O_5) \leq$ about 17% by weight, preferably $\leq$ about 14% by weight, should therefore not be exceeded, particular preference being given to $(La_2O_3+Nb_2O_5) \leq$ about 11% by weight.

In order to vary and precisely set the low Abbe number at the same time as a high refractive index, desirably the glasses include about 0.1–about 2% by weight of $Y_2O_3$ and can also contain up to about 1% by weight of each of $Gd_2O_3$ and $Ta_2O_5$. However, it is preferred to omit $Gd_2O_3$ and $Ta_2O_5$. The $Y_2O_3$ content is preferably at least about 0.2% by weight, with a $Y_2O_3$ content of at most about 0.5% by weight being particularly preferred.

In order to improve the melting properties, the glasses contain from about 2.5 to about 10% by weight of $Na_2O$ and can include up to about 3% by weight of $K_2O$. At higher contents of each, crystallization could be increased. The component $Li_2O$, which likewise promotes crystallization, is usually not required. The glasses preferably can include at most about 8% by weight of $Na_2O$ and contain no $K_2O$. Even more preference is given to a content of at most about 7% by weight of $Na_2O$, with an $Na_2O$ content of from about 3 to about 6% by weight being particularly preferred.

Depending on the restrictions on the respective ranges of the components, the ranges of the glasses' optical data can also be restricted.

Thus, glasses having a refractive index $n_d$ of from 1.66 to 1.85 and an Abbe number $v_d$ of from 28 to 42 can be obtained in the following composition range (in % by weight, based on oxide) : $SiO_2$ 10–25, $B_2O_3$ 10–20, $Na_2O$ 2.5–8, CaO 0.5–3, BaO 18–30, ZnO 5–12, $TiO_2$ 6–15, $ZrO_2$ 1–5, $Y_2O_3$ 0.2–2, $La_2O_3$ 0.5–8, $Nb_2O_5$ 6–14, $La_2O_3+Nb_2O_5 \leq 14$, $Ta_2O_5$ 0–1, $Gd_2O_3$ 0–1.

Glasses having refractive indexes $n_d$ of from 1.70 to 1.79 and Abbe numbers $v_d$ of from 30 to 39 can be found in the following composition range (in % by weight, based on oxide): $SiO_2$ 15–25, $B_2O_3$ 10–20, $Na_2O$ 2.5–7, CaO 0.5–3, BaO 18–30, ZnO 5–12, $TiO_2$ 6–15, $ZrO_2$ 1–5, $Y_2O_3$ 0.2–2, $La_2O_3$ 0.5–8, $Nb_2O_5$ 6–14, $La_2O_3+Nb_2O_5 \leq 14$.

Glasses from the composition range (in % by weight, based on oxide): $SiO_2$ 15–20, $B_2O_3$ 14–19, $Na_2O$ 3–6, CaO 0.5–2.5, BaO 25–30, ZnO 7–11, $TiO_2$ 7–12, $ZrO_2$ 2.5–5, $Y_2O_3$ 0.2–0.5, $La_2O_3$ 0.5–2, $Nb_2O_5$ 7–9.5, $La_2O_3+Nb_2O_5 \leq 11$, can have refractive indexes $n_d$ of from 1.73 to 1.77 and Abbe numbers $v_d$ of from 33 to 37.

Generally, in order to improve the glass quality, one or more fining agents such as conventional fining agents, can be added to the batch in the usual amounts in order to fine the glass. Desirably, the glass thus has particularly good internal glass quality with respect to freedom from bubbles and streaks. As an example, $As_2O_3$ can be used in an amount of up to and including 1% by weight.

If the fining agent used is not $As_2O_3$, but instead, for example, $Sb_2O_3$, which is generally possible without losses with respect to the glass quality, the essentially lead-free glasses according to the invention can be in addition essentially free from arsenic.

The $Sb_2O_3$ content is preferably from about 0.1 to about 0.5% by weight. It is furthermore preferred for the glasses, where appropriate also in addition to $Sb_2O_3$, to include up to about 0.5% by weight of fluoride, which likewise has a fining action. Fluoride can be added, for example, as $CaF_2$ or even NaF.

The glasses according to the invention have the following advantages in addition to the desired optical properties:

The glasses can be essentially or preferably PbO-free, and, in a preferred embodiment, also essentially $As_2O_3$-free or desirably $As_2O_5$-free. The glasses can have good crystallization stability, evident from a low upper devitrification limit. This can enable production in a continuous melting unit. A measure of a crystallization stability which can be adequate for production of this type is the viscosity at the upper devitrification limit. For continuous production, it should be $\geq$ about 1000 dPas. This can be satisfied by the glasses according to the invention. Such a crystallization stability of the glasses may also enable further thermal treatment of the glasses, such as pressing or re-pressing.

The glasses may not only have good processing properties, but can also have good melting properties. Generally, this is also evident from their melting points of about 1200° C.

The glasses can have excellent alkali resistance, generally evident from their classification in alkali resistance glass AR=1, while also otherwise having adequate chemical resistance. The chemical resistance of the glasses can be of importance for their further treatment, such as grinding and polishing.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure[s] of all applications, patents and publications, cited above [or below], and of corresponding German application No. 19920865.4-45, filed May 6, 1999 is hereby incorporated by reference.

EXAMPLE

Seven (7) examples of glasses according to the invention were produced from conventional raw materials.

Table 2 shows the respective compositions (in % by weight, based on oxide), the refractive index $n_d$, the Abbe number $v_d$, the partial dispersion in the blue region of the spectrum $P_{g,F}$, and the anomaly of this partial dispersion $\Delta P_{g,F}[10^{-4}]$, the density $\rho[g/cm^3]$, the coefficient of thermal expansion $\alpha_{20/300}[10^{-6}/K]$, the glass transition temperature $T_g[°C.]$ of the glasses, and for some of the examples also the upper devitrification limit UDL [° C.].

If the relative partial dispersion Px, y for the wavelengths x and y can be defined by the equation $$Px,y=(nx-ny) / (nF-nC) \quad (1)$$

then as Abbe showed the following linear relationship will probably apply, to so called "normal glasses":

$$Px,y=axy+b \cdot xy \cdot nd=Px,y \quad (2)$$

Correction of the secondary spectrum, i.e., achromatization for more than two wavelengths, sometimes necessitates the use of at least one glass type which does not conform with this rule.

Therefore it is desirable to find a glass that deviates noticeably from Abbe's empirical rule; that is, glasses which possess deviating partial dispersions.

A measure of this deviation is the ordinate difference DP given by the respective P-nd-point displaced from Abbe's "normal line". Instead of equation (2) the following generally valid relationship is used.

$$Px,y = a\ xy + b\ xy \cdot nd + DPx,y = Px,y + DPx,y \quad (3)$$

The term DPx,y is thus a quantitative description of dispersion behavior that differs from that of "normal glasses".

The deviations Dp from the "normal lines" for the following five relative partial dispersions are tabulated for each glass type in the data sheets.

$$PC, t = (nC - nt)/(nF - nC) \quad Pg, F = (ng - nF)/(nF - nC) \quad (4)$$

$$PC, s = (nC - ns)/(nF - nC) \quad Pi, g = (ni - ng)/(nF - nC)$$

$$PF, e = (nF - ne)/nF - nC)$$

PC, s and Pg,F are plotted versus the Abbe-value nd in a diagram enclosed with the catalog. The position of the normal lines is determined based on value pairs of the glass types K7 and F2.

$$PC, t = 0.5450 + 0.004743 \cdot nd \quad Pg, F = 0.6438 - 0.001682 \cdot nd$$

$$PC, s = 0.4029 + 0.002331 \cdot nd \quad Pi, g = 1.7241 - 0.008382 \cdot nd$$

$$PF, e = 0.4884 - 0.000526 \cdot nd$$

(See also Property of Optical Glass, Chapter 214+215, and pp. 27–33.)

The glasses according to the invention were produced as follows: the raw materials for the oxides, preferably free carbonates or nitrates, were pre-mixed, the fining agent was added, and the components were then mixed thoroughly. The glass batch was melted in a batch melting unit at melting temperatures of from about 1180° C. to 1220° C., then fined and homogenized well. The casting temperature was about 950° C.

Tables 1 and 2 show melt examples.

TABLE 1

Melt example for 100 kg of calculated glass

| Oxide | % by weight | Raw material | Weight [kg] |
|---|---|---|---|
| $SiO_2$ | 22.0 | $SiO_2$ | 22.0 |
| $B_2O_3$ | 20.0 | $H_3BO_3$ | 35.7 |
| $Na_2O$ | 5.0 | $Na_2CO_3$ | 8.6 |
| CaO | 0.5 | $CaCO_3$ | 0.9 |
| BaO | 20.0 | $BaCO_3$ | 23.3 |
| ZnO | 5.0 | ZnO | 5.0 |
| $TiO_2$ | 15.0 | $TiO_2$ | 15.0 |
| $ZrO_2$ | 1.0 | $ZrO_2$ | 1.0 |
| $Y_2O_3$ | 1.0 | $Y_2O_3$ | 1.0 |
| $La_2O_3$ | 0.5 | $La_2O_3$ | 0.5 |
| $Gd_2O_3$ | 1.0 | $Gd_2O_3$ | 1.0 |
| $Nb_2O_5$ | 9.0 | $Nb_2O_5$ | 9.0 |
| $Sb_2O_3$ | 0.2 | $Sb_2O_3$ | 0.2 |
| Σ | 100.2 | | 123.2 |

The properties of the resultant glass are shown in Table 2, Example 3. Examples 1 and 7 show compositions close to the edges of the claimed composition range and accordingly represent, even among the examples, the extremes with respect to refractive index and Abbe number. However, their physical properties correspond to those of the glasses from the narrower preferred composition ranges.

TABLE 2

Glass compositions (in % by weight, based on oxide) and essential properties of the glasses

| | 1 | 2 | 3 | 4 | 5 | 6 | 7 |
|---|---|---|---|---|---|---|---|
| $SiO_2$ | 11 | 16.5 | 22 | 17 | 22 | 25 | 25 |
| $B_2O_3$ | 10 | 10 | 20 | 16 | 18 | 10 | 20 |
| $Na_2O$ | 2.5 | 2 | 5 | 4 | 4 | 7 | 8 |
| $K_2O$ | — | 0.5 | — | — | 1 | — | — |
| CaO | 3 | 3 | 0.5 | 1.5 | 0.5 | 3 | 3 |
| BaO | 30 | 30 | 20 | 29 | 18 | 22 | 22 |
| ZnO | 12 | 12 | 5 | 9 | 7 | 12 | 5 |
| $TiO_2$ | 15 | 6 | 15 | 10 | 15 | 6 | 7 |
| $ZrO_2$ | 5 | 5 | 1 | 4 | 3 | 5 | 2 |
| $Y_2O_3$ | 1 | 1 | 1 | 0.5 | 1 | 1 | 1 |
| $La_2O_3$ | 0.5 | 8 | 0.5 | 1 | 0.5 | 1 | 1 |
| $Nb_2O_5$ | 10 | 6 | 9 | 8 | 9 | 8 | 6 |
| $Gd_2O_3$ | — | 1 | — | — | — | — | — |
| $Ta_2O_5$ | — | — | — | — | 1 | — | — |
| $Sb_2O_3$ | 0.2 | 0.2 | 0.2 | 0.2 | 0.2 | 0.2 | 0.2 |
| $n_d$ | 1.8478 | 1.7634 | 1.6697 | 1.7449 | 1.7484 | 1.7103 | 1.6697 |
| $v_d$ | 28.82 | 37.55 | 41.21 | 34.89 | 30.59 | 38.11 | 41.22 |
| $P_{g, F}$ | 0.6033 | 0.5794 | 0.6021 | 0.5893 | 0.6023 | 0.5786 | 0.5743 |
| $\Delta P_{g, F} [10^{-4}]$ | 80 | −12 | 105 | 40 | 99 | −11 | −1 |
| $\rho$ [g/cm$^3$] | 4.12 | 4.11 | 3.35 | 3.71 | 3.40 | 3.63 | 3.32 |
| $\alpha_{20/300}$ [10$^{-6}$/K.] | 9.1 | 9.0 | 7.6 | 8.4 | 7.5 | 8.9 | 8.9 |
| $T_g$ [° C.] | 568 | 574 | 551 | 556 | 557 | 547 | 551 |
| UDL [° C.] | 1130 | 1050 | 1125 | n.m. | n.m. | 870 | * |

*= no devitrification (measurement range 755–1200° C.)
n.m. = not measured

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An essentially lead-free or lead-free optical glass having a refractive index $n_d$ of from 1.65 to 1.87 and an Abbe number $v_d$ of from 27 to 43, and comprising in % by weight, based on oxide:

| | |
|---|---|
| $SiO_2$ | 10–25 |
| $B_2O_3$ | ≧10–25 |
| $Na_2O$ | 2.5–10 |
| $K_2O$ | 0–3 |
| $CaO$ | 0.5–5 |
| $BaO$ | 15–30 |
| $ZnO$ | 5–15 |
| $TiO_2$ | 6–15 |
| $ZrO_2$ | 0.5–8 |
| $Y_2O_3$ | 0.1–2 |
| $La_2O_3$ | 0.5–8 |
| $Nb_2O_5$ | 6–12 |
| with $La_2O_3 + Nb_2O_5$ | ≦17 |
| $Ta_2O_5$ | 0–1 |
| $Gd_2O_3$ | 0–1 | and optionally a fining agent.

2. The glass according to claim 1, wherein the $ZrO_2/TiO_2$ weight ratio is from 0.06 to 0.85.

3. The glass according to claim 2, wherein the glass comprises refractive index $n_d$ of from 1.66 to 1.85 and an Abbe number $v_d$ of from 28 to 42, and in % by weight, based on oxide:

| | |
|---|---|
| $SiO_2$ | 10–25 |
| $B_2O_3$ | ≧10–20 |
| $Na_2O$ | 2.5–8 |
| $CaO$ | 0.5–5 |
| $BaO$ | 18–30 |
| $ZnO$ | 5–15 |
| $TiO_2$ | 6–15 |
| $ZrO_2$ | 1–5 |
| $Y_2O_3$ | 0.2–2 |
| $La_2O_3$ | 0.5–8 |
| $Nb_2O_5$ | 6–10 |
| with $La_2O_3 + Nb_2O_5$ | ≦14 |
| $Ta_2O_5$ | 0–1 |
| $Gd_2O_3$ | 0–1. |

4. The glass according to claim 1 comprising a refractive index $n_d$ of from 1.70 to 1.79 and an Abbe number $v_d$ of from 30 to 39, and in % by weight, based on oxide:

| | |
|---|---|
| $SiO_2$ | 15–25 |
| $B_2O_3$ | ≧10–20 |
| $Na_2O$ | 2.5–7 |
| $CaO$ | 0.5–3 |
| $BaO$ | 18–30 |
| $ZnO$ | 5–12 |
| $TiO_2$ | 6–15 |
| $ZrO_2$ | 1–5 |
| $Y_2O_3$ | 0.2–2 |
| $La_2O_3$ | 0.5–8 |
| $Nb_2O_5$ | 6–10 |
| with $La_2O_3 + Nb_2O_5$ | ≦14. |

5. The glass according to claim 1 comprising a refractive index $n_d$ of from 1.73 to 1.77 and an Abbe number $v_d$ of from 33 to 37, and in % by weight, based on oxide:

| | |
|---|---|
| $SiO_2$ | 15–20 |
| $B_2O_3$ | 14–29 |
| $Na_2O$ | 3–6 |
| $CaO$ | 0.5–2.5 |
| $BaO$ | 25–30 |
| $ZnO$ | 7–11 |
| $TiO_2$ | 7–12 |
| $ZrO_2$ | 2.5–5 |
| $Y_2O_3$ | 0.2–0.5 |
| $La_2O_3$ | 0.5–2 |
| $Nb_2O_5$ | 7–9.5 |
| with $La_2O_3 + Nb_2O_5$ | ≦11. |

6. The glass according to claim 1, further comprising about 0.1 to about 0.5% by weight of $Sb_2O_3$.

7. The glass according to claim 1, further comprising up to about 0.5% by weight of fluoride.

8. The glass according to claim 1, wherein the glass is essentially free from arsenic oxide.

9. In an optical component comprising a glass, the improvement wherein the essentially lead-free or lead-free glass is a glass of claim 1.

10. An essentially lead-free or lead-free optical glass having a refractive index $n_d$ of from 1.65 to 1.87 and an Abbe number $v_d$ of from 27 to 43, and comprising in % by weight, based on oxide:

| | |
|---|---|
| $SiO_2$ | about 10–about 25 |
| $B_2O_3$ | ≧ about 10–about 25 |
| $Na_2O$ | about 2.5–about 10 |
| $K_2O$ | about 0–about 3 |
| $CaO$ | about 0.5–about 5 |
| $BaO$ | about 15–about 30 |
| $ZnO$ | about 5–about 15 |
| $TiO_2$ | about 6–about 15 |
| $ZrO_2$ | about 0.5–about 8 |
| $Y_2O_3$ | about 0.1–about 2 |
| $La_2O_3$ | about 0.5–about 8 |
| $Nb_2O_5$ | about 6–about 12 |
| with $La_2O_3 + Nb_2O_5$ | ≦ about 17 |
| $Ta_2O_5$ | 0–about 1 |
| $Gd_2O_3$ | 0–about 1 | and optionally a fining agent.

* * * * *